United States Patent
Dinius et al.

(10) Patent No.: US 10,946,518 B2
(45) Date of Patent: Mar. 16, 2021

(54) SPATIOTEMPORAL CONTROLLER FOR CONTROLLING ROBOT OPERATION

(71) Applicant: inVia Robotics, Inc., Westlake Village, CA (US)

(72) Inventors: Joseph William Dinius, Oak Park, CA (US); Brandon Pennington, Encino, CA (US); Randolph Charles Voorhies, Culver City, CA (US); Lior Elazary, Agoura Hills, CA (US); Daniel Frank Parks, II, Los Angeles, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 366 days.

(21) Appl. No.: 16/044,344

(22) Filed: Jul. 24, 2018

(65) Prior Publication Data
US 2020/0030975 A1   Jan. 30, 2020

(51) Int. Cl.
*B25J 9/16*       (2006.01)
*G05D 1/00*      (2006.01)

(52) U.S. Cl.
CPC ........... *B25J 9/1664* (2013.01); *B25J 9/1633* (2013.01); *B25J 9/1679* (2013.01)

(58) Field of Classification Search
USPC ................................................ 700/245–264
See application file for complete search history.

(56) References Cited

U.S. PATENT DOCUMENTS

| | | | | |
|---|---|---|---|---|
| 5,046,022 A * | 9/1991 | Conway | ............... | G05B 19/427 |
| | | | | 700/250 |
| 8,930,133 B2 * | 1/2015 | Wurman | ............... | G06Q 10/087 |
| | | | | 701/422 |
| 9,087,314 B2 * | 7/2015 | Hoffman | .......... | G05B 19/41895 |
| 9,519,284 B2 * | 12/2016 | Wurman | ............... | G05B 19/4189 |
| 9,740,212 B2 * | 8/2017 | D'Andrea | ............ | G05D 1/0291 |
| 9,833,901 B2 * | 12/2017 | Perrone | .................. | B25J 9/1661 |
| 9,952,053 B2 * | 4/2018 | Fong | .................... | G05D 1/0238 |
| 10,093,526 B2 * | 10/2018 | D'Andrea | ............... | B66F 9/063 |
| 10,296,012 B2 * | 5/2019 | Lalonde | ............... | G05D 1/0217 |
| 10,480,947 B2 * | 11/2019 | Lalonde | ............... | G01C 21/206 |
| 2007/0294029 A1 * | 12/2007 | D'Andrea | ............ | G05D 1/0246 |
| | | | | 701/410 |

(Continued)

*Primary Examiner* — Jonathan L Sample
(74) *Attorney, Agent, or Firm* — Ansari Katiraei LLP; Arman Katiraei; Sadiq Ansari (57) ABSTRACT

A robot may include a spatiotemporal controller for controlling the kinematics or movements of the robot via continuous and/or granular adjustments to the actuators that perform the physical operations of the robot. The spatiotemporal controller may continuously and/or granularly adjust the actuators to align completion or execution of different objectives or waypoints from a spatiotemporal plan within time intervals allotted for each objective by the spatiotemporal plan. The spatiotemporal controller may also continuously and/or granularly adjust the actuators to workaround unexpected conflicts that may arise during the execution of an objective and delays that result from a workaround while still completing the objective within the allotted time interval. By completing objectives within the allotted time intervals, the spatiotemporal controller may ensure that conflicts do not arise as the robots simultaneously operate in the site using some of the same shared resource.

18 Claims, 7 Drawing Sheets

(56) References Cited

U.S. PATENT DOCUMENTS

| | | | |
|---|---|---|---|
| 2008/0051985 A1* | 2/2008 | D'Andrea | G05D 1/0212 701/410 |
| 2013/0302132 A1* | 11/2013 | D'Andrea | G06Q 10/08 414/807 |
| 2014/0277691 A1* | 9/2014 | Jacobus | B66F 9/063 700/216 |
| 2016/0101940 A1* | 4/2016 | Grinnell | G05D 1/0297 700/216 |
| 2016/0129592 A1* | 5/2016 | Saboo | G05D 1/0297 700/248 |
| 2017/0113352 A1* | 4/2017 | Lutz | G05D 1/0291 |
| 2017/0176999 A1* | 6/2017 | Bobda | G05D 1/0297 |
| 2017/0192431 A1* | 7/2017 | Foster | G05D 1/0088 |
| 2017/0357270 A1* | 12/2017 | Russell | G05D 1/0242 |
| 2018/0178376 A1* | 6/2018 | Lalonde | B25J 9/1651 |
| 2018/0178382 A1* | 6/2018 | Lalonde | B25J 9/1666 |
| 2018/0211347 A1* | 7/2018 | Chen | G05D 1/0297 |
| 2018/0307941 A1* | 10/2018 | Holz | B66F 9/00 |
| 2018/0308069 A1* | 10/2018 | Starks | G06Q 10/20 |
| 2019/0160675 A1* | 5/2019 | Paschall, II | G05D 1/0214 |
| 2019/0161274 A1* | 5/2019 | Paschall, II | B65G 1/0492 |
| 2019/0196480 A1* | 6/2019 | Taylor | G05D 1/0088 |

* cited by examiner

SPATIOTEMPORAL CONTROLLER FOR CONTROLLING ROBOT OPERATION

BACKGROUND INFORMATION

Robots have been and continue to be introduced into the workplace to automate various tasks therein. Robots are autonomous machines that may work in tandem with humans or with other robots.

A robot may move, via some form of locomotion (e.g., wheels, tracks, legs, propellers, etc.), to deliver goods or perform other tasks in a warehouse or other site. Simultaneously, humans, other robots, and/or other objects may move in the same site. As congestion increases, so too do the navigational and operational challenges. For instance, increased congestion may lead to an increase in the number of collisions, deadlocks, and other conflicts.

Robots may operate according to a set of programmed movements. For instance, a robot may accelerate at a specific rate for forward movement, may move forward at a first speed after acceleration, may perform turns at a second speed, may raise and/or lower a platform at a third speed, and may perform other physical operations according to a fixed programmed set of movements.

Operating with the set of programmed movements may lower the efficiency of the robot. For instance, the robot may be unable to granularly adjust its movements to preemptively avoid a conflict. Without the ability to deviate from a set of programmed movements (e.g., perform gradual adjustments), a robot may be unable to operate in a continuous manner and may continually interrupt its own movements by starting and stopping to avoid conflicts or make other changes to its operation. Each such interruption can have a cascading effect that may cause the robot and/or other robots to miss completing timed objectives.

DETAILED DESCRIPTION OF PREFERRED EMBODIMENTS

Systems and methods, as presented herein, provide a spatiotemporal controller for controlling the kinematics or movements of an autonomous robot via continuous and/or granular adjustments to the actuators that perform the physical operations of the robot. The spatiotemporal controller may operate each of the actuators in any state between an off state and a maximum operating state supported by that actuator, and is not restricted to operating the actuators according to limited fixed or programmed states.

The spatiotemporal controller may continuously and/or granularly adjust the actuators to align completion or execution of different objectives or waypoints from a spatiotemporal plan within time intervals allotted for each objective or waypoint by the spatiotemporal plan. The spatiotemporal controller may also continuously and/or granularly adjust the actuators to workaround unexpected conflicts that may arise during the execution of an objective, and delays that result from a workaround while still completing the objective within the allotted time interval.

The spatiotemporal controller of a robot may include specialized hardware of the robot. For instance, the spatiotemporal controller may be implemented as an application-specific integrated circuit or by one or more processors of the robot. In some embodiments, the spatiotemporal controller may be specialized software that is stored to a non-transitory computer-readable medium of the robot. The specialized software may include a set of processor-executable instructions that can be executed by the one or more processors of the robot. Other components of the spatiotemporal controller may be described below with reference to FIG. 7.

The spatiotemporal controller may control different actuators of a robot according to a spatiotemporal plan. More specifically, the spatiotemporal controller may manipulate the actuators to produce physical movements and other physical operations that execute the different objectives of a spatiotemporal plan within the time interval allotted for each objective by the spatiotemporal plan. The physical movements may include movements of the robot or mechanical elements of the robot. The spatiotemporal controller may control the physical operation of the actuators by controlling power, speed, angle, acceleration, torque, force, range, and/or other configurable operations of an actuator in any of an essentially infinite range between an off state and a maximum operating state supported by that actuator.

The actuators may include hydraulic, electrical, combustion, or other motors or engines associated with locomotion, lifts, and/or components that generate driving, pushing, or pulling forces. The actuators may also include mechanical arms, vacuums, suction elements, magnets, levers, pistons, movable platforms, and/or other mechanical elements of the robot. For instance, the spatiotemporal controller may control these and other actuators by regulating the voltage and/or current provided to the actuators at any point in time and/or by providing messaging that continuously changes actuator operation. In doing so, the spatiotemporal controller can change the speed with which the robot moves, when and how a robot turns, and/or other physical movements of the robot.

In some embodiments, the spatiotemporal controller may access different sensors of the robot to facilitate the control of the actuators. For example, the spatiotemporal controller may access one or more of a camera, accelerometer, LiDAR, radar, depth camera, magnetometer, gyroscope, wheel rotational sensor, light sensor (e.g., photoresistor or photovoltaic cell), microphone, temperature sensor, contact sensor, proximity sensor, pressure sensor, tilt sensor, inertial measurement unit, voltage sensor, electric current sensor, clock, and/or other sensors that may be available on a robot. The spatiotemporal controller, based on the sensor output, may identify whether the robot is on schedule to a complete a task or objective by the time envelope allotted for that task or objective, and may speed up, slow down, or otherwise change the physical operation of one or more actuators accordingly. The spatiotemporal controller may also determine whether execution of a waypoint is unsuccessful or successful based on the sensor output.

Each spatiotemporal plan may provide a robot non-conflicting access to different resources (e.g., points in space) and different time intervals with which to access the different resources. A time interval associated with a given resource may specify a first time after which the robot may access the resource, and/or a second time after which the robot is to complete its access of the resource. The second time may be one or more seconds after the first time, or may be unconstrained. Each spatiotemporal plan may also provide a precedence ordering by which different robots may access the same shared resource. The precedence ordering may be based on the time intervals, and may be used in conjunction with the time intervals to further eliminate conflict (e.g., collision, delay, becoming deadlocked, etc.).

The spatiotemporal plan resources may correspond to points in space and/or time. The points in space and time associated with a spatiotemporal plan resource can be defined with any desired granularity. As one example, a point in space may be 2 feet in length and 2 feet in width, and a 2 second time interval may be provided for a robot to access that point in space. As another example, a point in space may be 6 feet in length and 3 feet in width, and a 10 second interval may be provided for a robot to access that point in space. The more granular planning provides tighter control over the movements and operations of the robots, whereas a less granular planning provides the robots with more autonomy in executing the plan.

In addition to or instead of different points of physical space, each spatiotemporal plan may also provide a robot access to other shared resources at different time intervals. The shared resources may include shared compute resources, shared sensors, another robot (e.g., a retrieval robot accessing a picking robot), human workers, etc.

Figure 1:
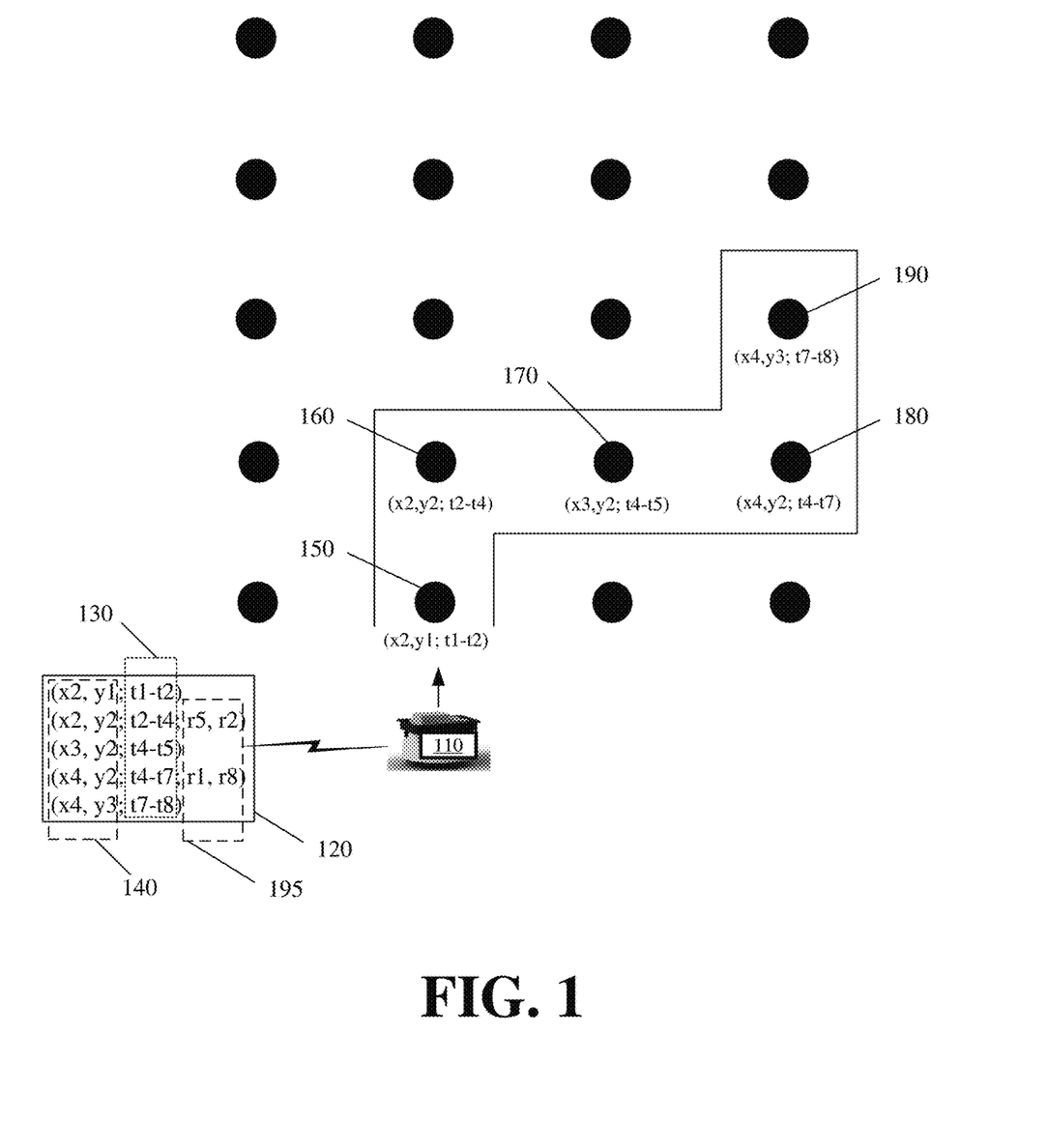
FIG. 1 illustrates an example of a robot navigating according to a spatiotemporal plan in accordance with some embodiments.

FIG. 1 illustrates an example of robot 110 navigating according to spatiotemporal plan 120. Spatiotemporal plan 120 identifies different time intervals 130 by which robot 110 may access different points in space 140. Each time interval 130 may specify an earliest access time by which robot 110 may access a corresponding point in space 140, and/or a last access time by which robot 110 is to complete access the corresponding point in space 140.

Each point in space 140 that is associated with a point in time 130 may represent a different waypoint 150, 160, 170, 180, and 190. Each waypoint 150-190 may therefore be a different objective for robot 110 to complete by a specific amount of time or within a time interval via physical robotic movements.

One or more of waypoints 150-190 may also be associated with a precedence order 195. The precedence order 195 identifies a shared resource that robot 110 and other robots are expected to access, and provides an order by which each robot is permitted to access the shared resource. For instance, precedence order 195 allows robot 110 to access waypoint 160, corresponding to a point in space (e.g., x2 and y2) within a specified time interval (e.g., t2-t4), after a first robot (e.g., robot "r5") and a second robot (e.g., robot "r2") have finished accessing that same point in space.

Precedence order 195 may be added to spatiotemporal plan 120 to ensure the coordinated operation of the robots, via adherence to their spatiotemporal plans, even when actual operation of robot 110 or the other robots deviates from the spatiotemporal plan being executed by the robot.

For instance, the spatiotemporal plans executed by the robots (e.g., robot 110, robot "r5", and robot "r2" in FIG. 1) are defined so that each robot may access a waypoint or resource without conflict. However, failures, outages, unexpected events, or actual movements or operation of a robot may cause the robot to arrive earlier or later than expected. Precedence order 195 may ensure that the robots adhere to their spatiotemporal plans and do not move out of order despite one or more robots deviating from their spatiotemporal plans.

The spatiotemporal controller of robot 110 controls the actuators of robot 110 to autonomously perform or complete the objective associated with each waypoint 150-190 within the time interval specified in spatiotemporal plan 120. For instance, the spatiotemporal controller may turn on and off different actuators, issue commands to the activated actuators, and/or adjust power that is supplied to the activated actuators to produce the physical robotic movements that execute the different waypoint objectives.

In FIG. 1, waypoints 150-190 are closely defined, leaving the spatiotemporal controller with less autonomy on how to complete each waypoint objective. In some embodiments, the waypoint objectives can be more loosely defined. For instance, the spatiotemporal plan may include individual waypoints that span one or more shared resources (e.g., physical space) and wider time intervals with which to access the one or more shared resources. In such instances, the spatiotemporal controller may have greater autonomy with respect to completing the waypoint objectives or tasks.

Figure 2:
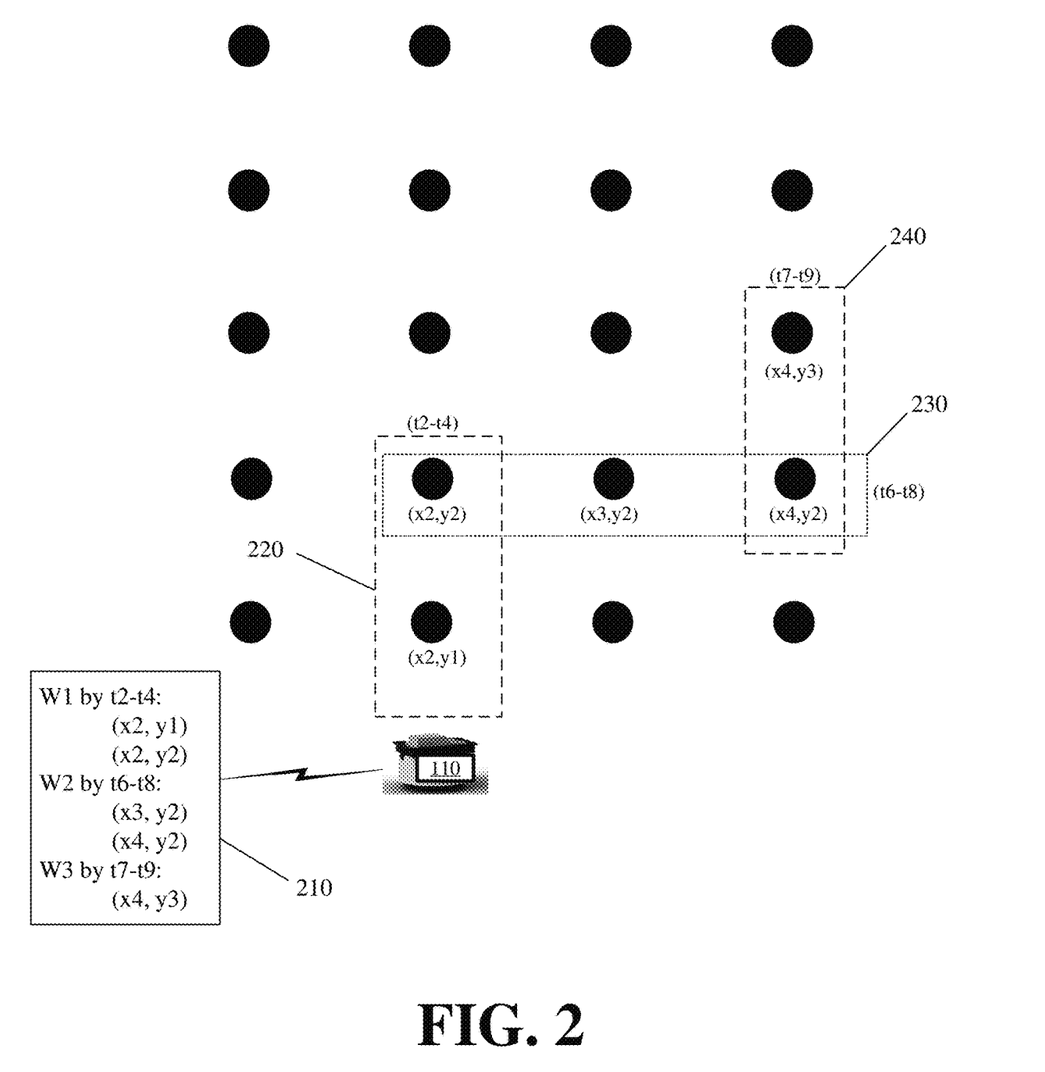
FIG. 2 illustrates an example of a robot navigating according to a spatiotemporal plan with waypoints that span one or more different points in space, and that provide different time envelopes.

FIG. 2 illustrates an example of robot 110 navigating according to spatiotemporal plan 210 with objectives 220, 230, and 240 that span one or more different points in space, and that provide a time interval for traversing the different points in space associated with each objective 220, 230, or 240. Spatiotemporal plan 210 may reserve a different set of space or other shared resources for robot 110 for different time intervals. For instance, spatiotemporal plan 210 may specify a task-to-time definition (e.g., move through (x2, y1) and (x2, y2) within time interval t2-t4, turn right and move through (x3, y2) and (x4, y2) within time interval t6-t8, and turn left, move through (x4, y3), and retrieve an item within time interval t7-t9). As noted above, the time intervals can also be unconstrained such that a different spatiotemporal plan may define movements of robot 110 based on a space-to-point in time definition (e.g., be at a first space no earlier than or by a first time, be at a second space no earlier than or by a second time, etc.).

The spatiotemporal controller of robot 110 may determine actuator controls for successfully executing each of objectives 220, 230, and 240 within the allotted time interval. For instance, objective 220 of plan 210 may provide robot 110 a 6 second time interval to travel 10 feet to successfully complete objective 220. The spatiotemporal controller may determine power settings for the motors of robot 110 to accelerate and travel with sufficient velocity to cover the 10 feet sometime before the 6 second time interval expires.

In some embodiments, the robot may make kinematic adjustments to complete a waypoint with some time buffer before the specified time interval for that waypoint expires. For instance, the robot may attempt to complete a waypoint with a 6 second time interval by 4 seconds in order to preserve time in the event any adjustments have to be made because of an unexpected obstacle, failure, or other conflict during execution of the waypoint, or because a precedence order providing other robots first access to one or more resources associated with the waypoint has yet to be met.

A waypoint or objective may include other tasks, in addition to or in lieu of physical movement in space, that a robot is to complete. For instance, a waypoint may include grabbing or picking of an item or object, moving a mechanical arm some distance in three-dimensional space, raising or lowering a platform by some amount, changing direction of a camera, placement of an object, opening or closing a door, and/or other movements.

In some embodiments, the spatiotemporal controller may be used for spatiotemporal plan generation. In some such embodiments, the spatiotemporal controller may be accessed at the time of the spatiotemporal plan generation to determine if a plan is kinematically feasible, before executing the plan and/or reserving the shared resources at the different points called for by the plan.

The spatiotemporal controller may adhere to certain restrictions that are associated with different shared resources of a site when controlling the physical operations of a robot (e.g., via control over the robot actuators) during execution of plan objectives, or when determining the kinematic feasibility of the plan. For example, the site may have certain high traffic sections or areas where humans may cross. Speed limits may be specified for the robots in these high traffic sections. Accordingly, the spatiotemporal controller may account for the speed limits and other site restrictions when controlling the physical operations of the robot, and/or determining the kinematic feasibility of a plan.

The spatiotemporal controller may make continuous adjustments to actuator usage based on a continually changing objective. The spatiotemporal controller may update the continually changing objective at each operational cycle of the spatiotemporal controller. Each operational cycle may span tens or hundreds of milliseconds (ms). During each operational cycle, the spatiotemporal controller may update operations or movements that one or more actuators of the robot perform before the next operational cycle. The spatiotemporal controller may cause the robot's actuators to perform the same or different operations or movements over each operational cycle to bring the robot closer towards completion of a waypoint from a spatiotemporal plan.

In some embodiments, the continually changing objective may be represented as a set of instance objectives. Each set of instance objectives partitions an overall waypoint or objective into several minute actuator movements or operations. Each instance objective represents an actuator movement or operation that can be performed during the brief time spanned by the spatiotemporal controller operational cycle. For instance, a waypoint from a spatiotemporal plan may specify an overall task or objective for a robot to execute in 5 seconds. The spatiotemporal controller of the robot may partition the waypoint into 50 instance objectives when each operational cycle of the spatiotemporal controller is 100 ms. Each of the 50 instance objectives is successfully completed by performing some actuator movement or operation that completes at least 1/50 of the overall task or objective.

The spatiotemporal controller may monitor sensors or the actuators at each operational cycle to determine whether each instance objective is successfully completed. In response to a successfully completed instance objective, the spatiotemporal controller executes the next instance objective via commands or other control of the actuators. In response to an unsuccessfully completed instance objective, the spatiotemporal controller may modify the next and subsequent instance objectives to compensate for the failed execution of the prior instance objective by changing the actuator movements or operations that are to be performed during subsequent operational cycles. For example, should the robot fail to cover a planned distance during a previous instance objective, the spatiotemporal controller can compensate and recover by accelerating or otherwise increasing speed of the robot's motors to traverse more distance in the current and/or next instance objective(s). In this manner, the spatiotemporal controller may execute a continually changing objective by updating operations and movements of the robot's actuators at each instance objective or operational cycle.

Figure 3:
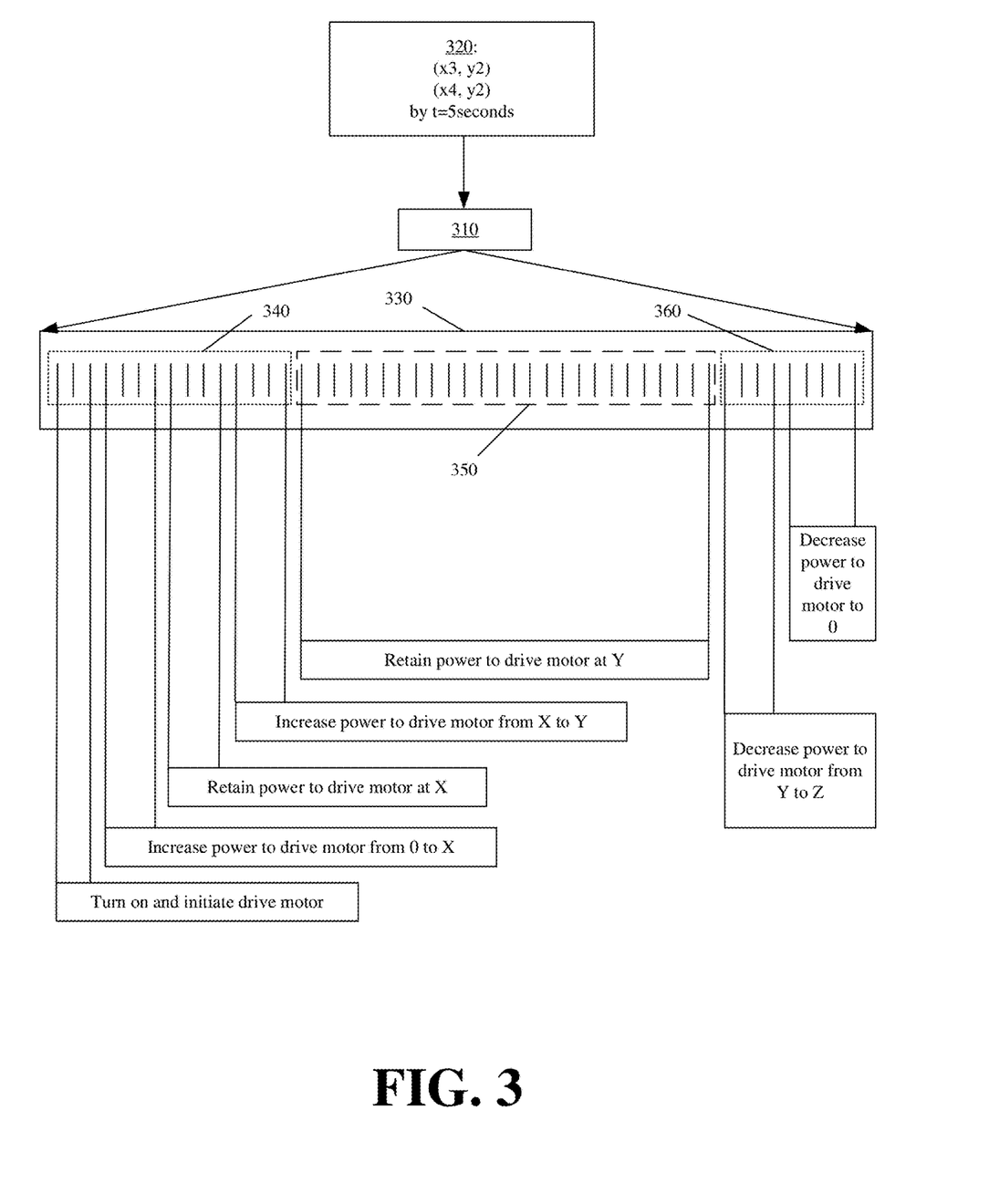
FIG. 3 conceptually illustrates example operation of a spatiotemporal controller.

The operational cycles of the spatiotemporal controller may vary depending on processing power of the robot, desired granularity over robotic movements, and/or power consumption. FIG. 3 conceptually illustrates an example of spatiotemporal controller 310 of a robot completing waypoint 320 from a spatiotemporal plan by continuously executing different instance objectives 330 that partition the overall task or objective of waypoint 320 into minute actuator movements or operations that are updated at each operational cycle of spatiotemporal controller 310.

In FIG. 3, waypoint 320 may include multiple points in space that the robot is to traverse by a specific point in time or specific amount of time. For example, waypoint 320 may be a straight distance of 10 feet that the robot is to traverse in 5 seconds.

Spatiotemporal controller 310 may execute an operational cycle every 100 ms. Accordingly, in this example, spatiotemporal controller 310 may partition the objective of waypoint 320 into 50 instance objectives 330.

A simplistic partitioning may include spatiotemporal controller 310 powering the motors of the robot to cover 0.2 feet every 100 ms (e.g., every instance objective or operational cycle). This simplistic partitioning does not however take into account real-world constraints and performance parameters of the robot's actuators. For instance, the robot cannot instantaneously accelerate to a given speed in the time of a single instance objective.

Accordingly, in some embodiments, spatiotemporal controller 310 analyzes the waypoint 320 to produce a non-uniform partitioning of actuator movements or operations over the set of instance objectives 330. The non-uniform partitioning may be produced based on spatiotemporal controller 310 determining the one or more actuators of the robot implicated by the one or more tasks or objectives of waypoint 320, tracking and accounting for the real-world constraints and performance parameters of the implicated actuators, and defining instance objectives 330 that are kinematically feasible based on the real-world constraints and performance parameters of the implicated actuators. An instance objective that is kinematically feasible is a movement or operation that a particular actuator can complete in the time of the instance objective.

The non-uniform partitioning, as shown in FIG. 3, may include spatiotemporal controller 310 powering the robot's motors to accelerate during a first subset of instance objectives 340. For example, each instance objective of the first subset of instance objectives 340 may include spatiotemporal controller 310 gradually increasing power that is provided to the robot's drive motors from 0 amperes (A) to 5 A. In this example, spatiotemporal controller 310 may increase power to the robot's drive motor by an additional 0.3 A during execution of each instance objective. As another example, spatiotemporal controller 310 may issue a command to increase power to the drive motor from 0 A to 2.5 A, wait until the drive motor reaches a first speed, before increasing power from 2.5 A to 5 A. Spatiotemporal controller 310 may control the drive motor by adjusting other operational parameters (e.g., voltage and current) of the drive motor, or by issuing commands (e.g., reach a particular revolutions per minute, reach a particular velocity, etc.) that the drive motor responds to with adjusted operational parameters.

During the first subset of instance objectives 340, the robot may be unable to cover 0.2 feet at each instance objective, and may instead cover, on average, 0.1 feet at each instance objective. Spatiotemporal controller 310 may compensate for the short distance traversed during execution of the first subset of instance objectives 340 by bringing the robot to a speed at which it may cover 0.5 feet with each instance objective of a subsequent second subset of instance objectives 350. For instance, spatiotemporal controller 310 may increase power to the drive motors of the robot while continuously monitoring a velocity receiver, accelerometer, speedometer, or other speed sensor to determine whether the robot is moving a desired amount of distance during execution of each instance objective. Updates by spatiotemporal controller 310 to the drive motor occur in an essentially continuous manner because of the short period of time associated with operational cycle of kinematic controller 310 and corresponding instance objective (e.g., tens or hundreds of ms). In FIG. 3, spatiotemporal controller 310 controls the robot to traverse more ground during execution of the second subset of instance objective 350 than during execution of the first subset of instance objectives 340.

Spatiotemporal controller 310 may then slow the robot's movements during execution of a third subset of instance objectives 360 in order to bring the robot to a stop at the end of the 10 feet objective of waypoint 320, whereby execution of the first, second, and third subsets of instance objectives 340, 350, and 360 span the 5 seconds provided as the time envelope for execution of waypoint 320.

In some embodiments, the spatiotemporal controller may create a buffer by preserving some instance objectives from the set of instance objectives for executing a waypoint objective. The instance objectives associated with the buffer can be used to compensate for unsuccessful execution of one or more other instance objectives without impacting successful completion of the overall task or objective associated with the waypoint. The spatiotemporal controller may update the continually changing objective to reduce the number of instance objectives that are available as a buffer as the robot is closer to successful completion of a waypoint objective.

Figure 4:
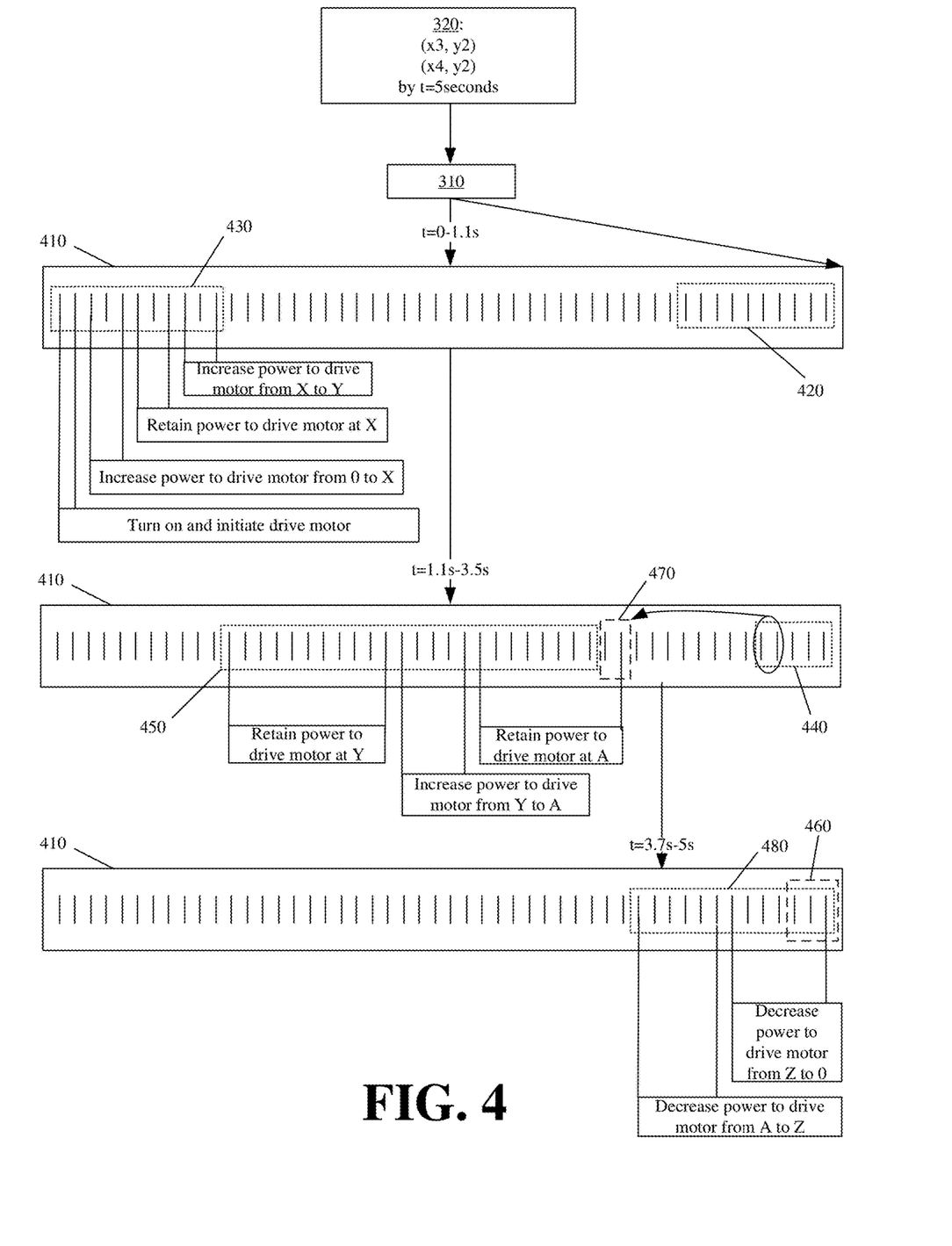
FIG. 4 illustrates an example of a spatiotemporal controller executing a continually changing objective based on a changing set of instance objectives and a changing buffer.

FIG. 4 illustrates an example of spatiotemporal controller 310 executing a continually changing objective based on a changing set of instance objectives 410 and a changing buffer. In FIG. 4, spatiotemporal controller 310 may execute the same overall task or objective of waypoint 320 from FIG. 3 with the changing buffer. For instance, the overall task or objective may include moving the robot a straight distance of 10 feet in 5 seconds, with spatiotemporal controller 310 operating at 100 ms operational cycles. Here again, spatiotemporal controller 310 has 50 instance objectives 410 with which to execute the overall task or objective of waypoint 320.

The changing buffer may include some changing percentage or number of instance objectives from the set of instance objectives 410 that are reserved for working around unexpected obstacles, failures, or conflicts. The number of reserved instance objectives for the buffer may be greater the farther the robot is from completing the overall objective or task of waypoint 320, and smaller the closer the robot is to completing the overall objective or task of waypoint 320.

As shown, spatiotemporal controller 310 may maintain a buffer 420 of 1 second from the total 5 second allotment at the beginning of the particular waypoint execution, and during execution of a first subset of instance objectives 430. In other words, spatiotemporal controller 310 may reserve 20% or 10 of the 50 instance objectives for a first buffer 420 during initial execution of waypoint 320. Spatiotemporal controller 310 may then determine a kinematically feasible usage of the robot's actuators to execute the tasks or objectives of waypoint 320 with the remaining 40 instance objectives not reserved for buffer 420. Each of the 40 instance objectives may include actuator movements or operations that bring the robot closer to successfully completing tasks or objectives of waypoint 320 by the buffer reduced 4 second time envelope.

Spatiotemporal controller 310 may begin to execute the instance objectives in a sequential manner. As an instance objective is successfully completed during an operational cycle of spatiotemporal controller 310, spatiotemporal controller 310 may execute a next instance objective during a next operational cycle.

Spatiotemporal controller may change from first buffer 420 to second buffer 440 by reducing the buffer size to 10% or 5 instance objectives once spatiotemporal controller 310 has successfully executed each of the first subset of the instance objectives 430 by a first amount of time.

Based on the reduced buffer size (e.g., 10 instance objectives to 5 instance objectives) of second buffer 440, spatiotemporal controller 310 may update the actuator movements or operations to execute the remaining tasks or objectives of waypoint 320 with the remaining instance objectives (e.g., 40−11+5). In this figure, spatiotemporal controller 310 attempts to traverse 5 feet during the next 2.4 seconds (e.g., second amount of time) or second subset of instance objective 450 (e.g., next 24 instance objectives).

Spatiotemporal controller 310 may again change from second buffer 440 to third buffer 460 by reducing the buffer size to 5% or 3 instance objectives once spatiotemporal controller 310 has successfully executed each instance objective of the second subset of instance objectives 450 by moving the robot 5 feet in the second amount of time (e.g., 2.4 seconds). In the event that the robot does not successfully traverse the desired 5 feet distance during the second amount of time, spatiotemporal controller 310 can use one or more of the 5 instance objectives reserved for second buffer 440 to compensate and make up the distance in order to successfully execute the objective of waypoint 320. For instance, spatiotemporal controller 310 is shown to use an additional two instance objectives 470 or 200 ms to completely traverse the desired 5 feet distance with the two instance objectives 470 coming from second buffer 440.

Spatiotemporal controller 310 may eliminate third buffer 460 or retain 5% or 3 instance objectives until the tasks or objectives of waypoint 320 are complete during a third amount of time (e.g., the final 1.3 seconds). For instance, spatiotemporal controller 310 may slow operation of the robot through execution of all remaining instance objectives 480 including instance objectives of third buffer 460 so that waypoint 320 is successfully completed by the allotted 5 second time interval for waypoint 320.

The single task of driving the robot in a straight direction may include different control of the same or different robot actuators over time (e.g., accelerating, maintaining speed, decelerating, etc.). The control of the actuators is further complicated when the waypoint involves different tasks and operations, and/or when the one or more tasks or objectives of the waypoint implicate different actuators of the robot.

Figure 5:
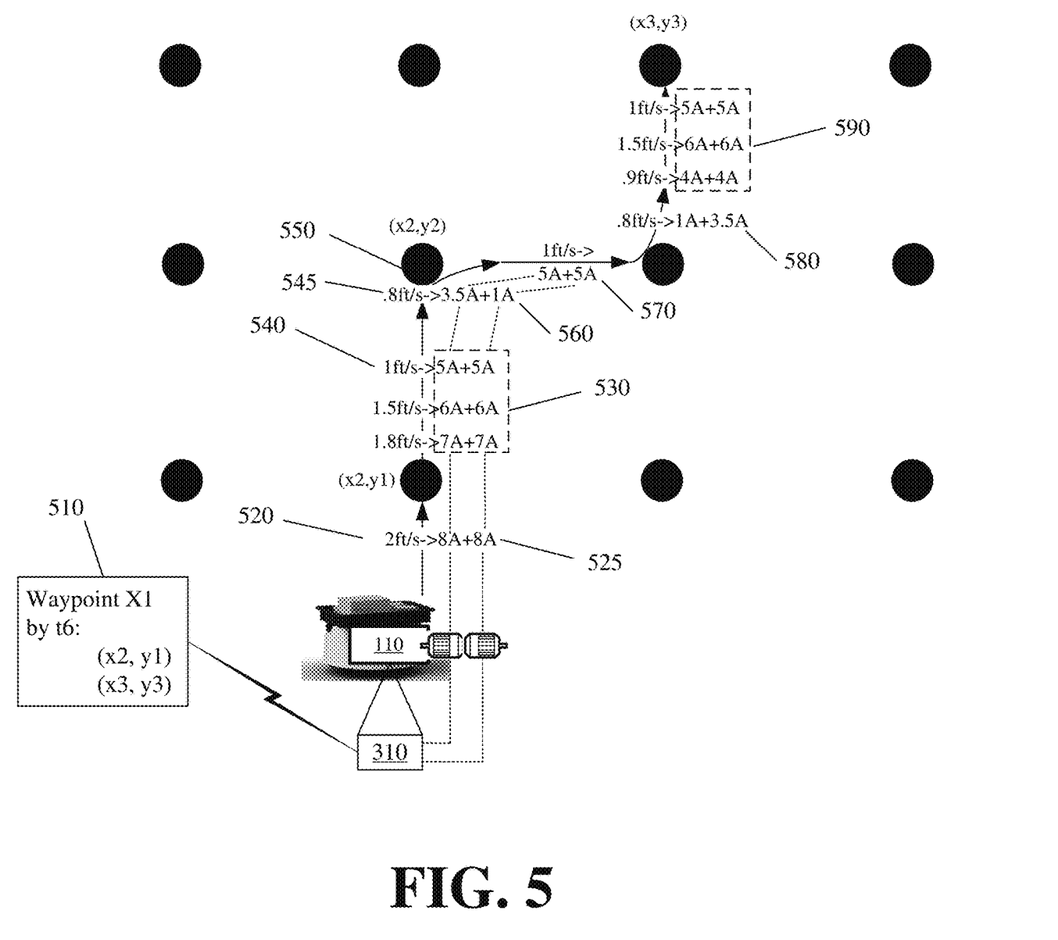
FIG. 5 illustrates an example of a spatiotemporal controller controlling movements of a robot.

FIG. 5 illustrates an example of spatiotemporal controller 310 of robot 110 controlling movements of robot 110 during execution of spatiotemporal plan waypoint 510 that includes different tasks. Waypoint 510 may specify a destination that robot 110 is to arrive at by a particular time envelope. The path to the destination may include robot 110 performing right and left turns. Spatiotemporal controller 310 may control movements of the robot 110 by controlling a left wheel motor and a right wheel motor of robot 110.

Robot 110 is initially shown entering the points of space associated with the waypoint at a first speed 520 based on spatiotemporal controller 310 supplying (at 525) a first and equal amount of power (e.g., 8 A) to the first and second motors. The first and equal amount of power supplied to the first and second motors causes robot 110 to move in a straight path at the first speed 520. Supplying the first amount of power may include spatiotemporal controller 310 continuously adjusting power that is supplied to the first and second motors during each instance objective that is executed during the time robot 110 moves at the first speed 520.

Spatiotemporal controller 310 may access different sensors of robot 110 to monitor the first speed 520, and detect that robot 110 is approaching a particular point in space that is associated with initiating the right turn. Based on the sensor information, spatiotemporal controller 310 may gradually reduce (at 530) the power to the first and second motors to slow movement of the robot from the first speed 520 to a slower second speed 540. The power reduction (at 530) occurs based on spatiotemporal controller 310 continuously updating and lowering the power to the first and second motors during execution of a subset of instance objectives.

Spatiotemporal controller 310 may be programmed to perform turns at a third speed 545 that is even slower than the second speed 540. The third speed 545 may be based on a maximum centripetal acceleration of robot 110, or is otherwise determined to be a safe speed to perform the turn based on dimensions and weight distribution of robot 110, turning radius, and/or safety for objects that may be carried by robot 110.

In response to detecting arrival of robot 110 at the particular point in space 550 where the right turn is to be initiated, spatiotemporal controller 310 may reduce (at 560) power to the left motor to operate the left motor at the third speed 545, and may further reduce (at 560) or shut off power to the right motor to cause robot 110 to perform the right turn at the third speed 545.

Waypoint 510 may call for robot 110 to traverse a short distance before having to initiate the left turn. Accordingly, spatiotemporal controller 310 may increase (at 570) power to both the right and left motors to cause robot 110 to move straight at the second speed 540, before updating and changing (at 580) the power that is provided to the left and right motors to perform the left turn at the third speed 545. Spatiotemporal controller 310 can then continuously adjust (at 590) power to move robot 110 in a straight line to the desired destination in the remaining time of the time envelope provided by waypoint 510.

Figure 6:
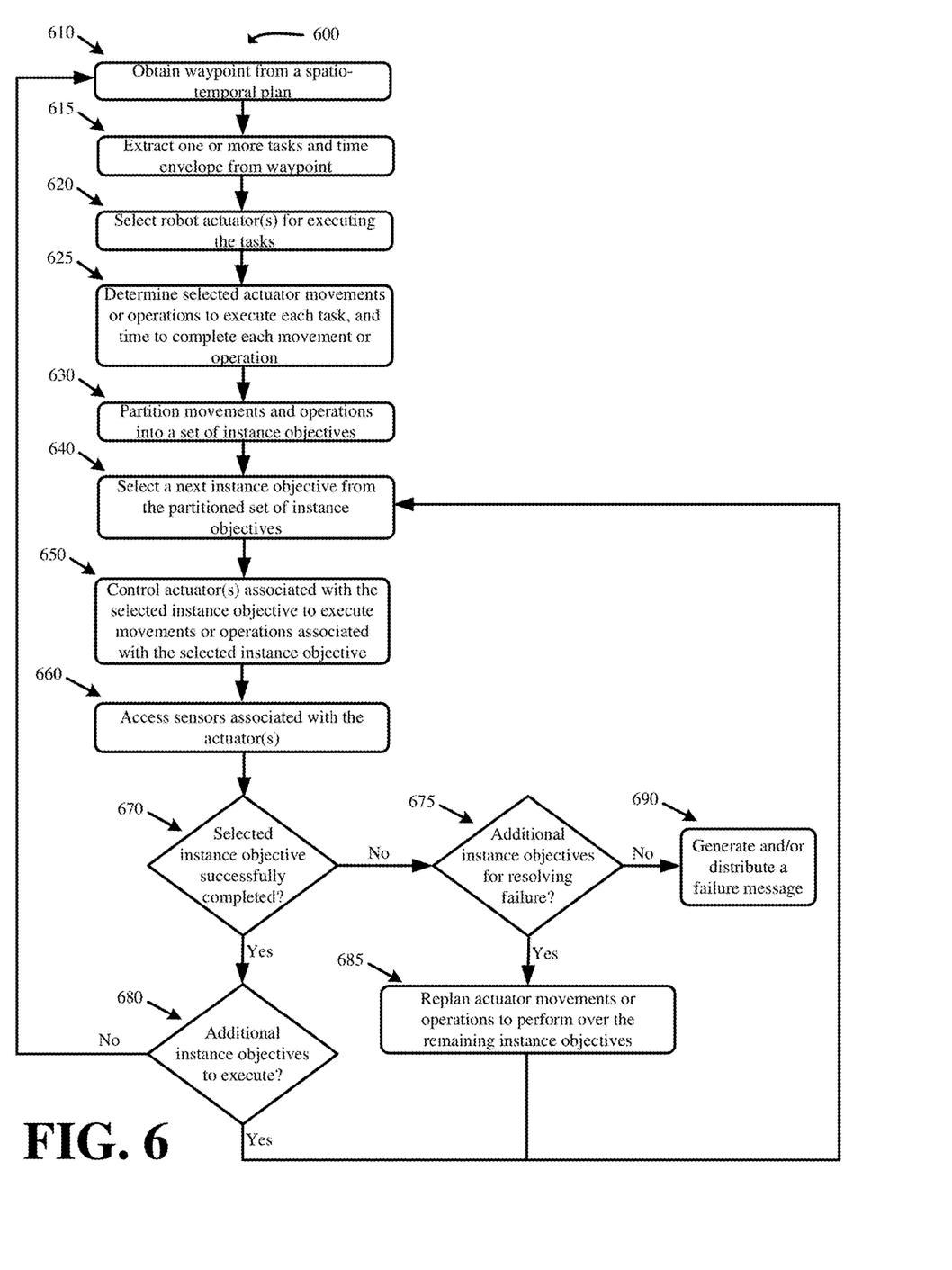
FIG. 6 presents a process for controlling the actuators of a robot according to the spatiotemporal robotic navigation set forth herein.

FIG. 6 presents a process 600 for controlling the actuators of a robot according to the spatiotemporal robotic navigation set forth herein. Process 600 may be performed by the spatiotemporal controller of the robot, and may include the spatiotemporal controller controlling the actuators of the robot in execution of each waypoint from a spatiotemporal plan.

Process 600 may include the spatiotemporal controller obtaining (at 610) a particular waypoint from the spatiotemporal plan. In some embodiments, the spatiotemporal controller receives the spatiotemporal plan once the plan is generated. The kinematic controller may receive the spatiotemporal plan from the central planner or a plan generating processor of the robot. The spatiotemporal controller may store the plan in local memory of the robot. The spatiotemporal controller may sequentially obtain (at 610) and execute each of the waypoints from the spatiotemporal plan. Alternatively, the central planner or the plan generating processor of the robot may directly provide the particular waypoint to the spatiotemporal controller once the spatiotemporal plan is generated.

Process 600 may further include extracting (at 615), from the particular waypoint, one or more tasks that the robot is to complete by a particular amount of time. The one or more tasks may include moving the robot through different points of space, moving or manipulating objects with different mechanical elements of the robots, and/or performing other physical movements or operations with the different actuators of the robot.

Process 600 may include selecting (at 620) one or more actuators of the robot that can be used to execute the tasks extracted (at 615) from the particular waypoint. For example, tasks involving moving a robot in space may implicate drive motors of the robot, whereas tasks involving picking an item may implicate actuators associated with a mechanical arm, vacuum, and/or lift of the robot. The spatiotemporal controller may store a task to actuator mapping. The mapping may differ from robot to robot depending on the actuators that each robot is configured with.

Process 600 may include determining (at 625) movements or operations of the one or more actuators to execute each task, and time to complete each movement or operation based on constraints and performance parameters of each actuator. For example, powering a drive motor at 5 A for one second may move the robot 2 feet, whereas powering the motor at 3 A for one second may move the robot 1 foot. In some embodiments, the spatiotemporal controller may access the various sensors of the robot to determine the movements that are needed to complete each task. For instance, a first task may include moving a robot to a particular point in space, and a second task may include moving a mechanical arm of the robot while the robot is at the particular point in space. To complete these tasks, the spatiotemporal controller may access a camera or positional sensor of the robot to determine the robot's current position for the first task, and may access an actuator associated with the mechanical arm to determine a position of the mechanical arm for the second task.

Process 600 may optionally determine whether execution of the particular waypoint is kinematically feasible with the implicated actuators and the constraints and performance parameters of the implicated actuators. Determining the kinematic feasibility of the particular waypoint may be avoided, because the spatiotemporal plan and the different waypoints therein may be determined to be kinematically feasible at the time the spatiotemporal plan is generated.

Process 600 may include partitioning (at 630) the movements and operations into a set of instance objectives. The portioning (at 630) may be based on the time to complete each movement or operation. For instance, a first actuator operation that takes 450 ms to complete may be partitioned into 5 instance objectives that each span 100 ms. Each of the 5 instance objectives may then perform some part of the first actuator operation. Partitioning (at 630) the movements and operations into the set of instance objectives may include assigning movements and operations of two different actuators to the same instance objective. For instance, the spatiotemporal controller may simultaneously control a first drive motor and a second drive motor over one or more instance objectives, or may simultaneously control movement and operation of a first actuator for raising and lowering a mechanical arm, and a second actuator for opening and closing a grabbing element at the end of the mechanical arm over one or more instance objectives. The set of instance objectives execute the overall task or objective of the particular waypoint within the particular amount of time provided for successful execution of the particular waypoint. The partitioning (at 630) may include providing a buffer, by reserving some percentage or number of instance objectives, to work around unsuccessful execution of any of the instance objectives.

Process 600 may select (at 640) a next instance objective from the partitioned set of instance objectives to perform during a current operational cycle of the spatiotemporal controller. Process 600 may control (at 650) the one or more actuators associated with the selected instance objective to execute movements or operations associated with the selected instance objective. For instance, the spatiotemporal controller may execute the movements or operations by issuing commands and/or controlling the amount of power that is provided to the one or more actuators.

At the end of the current operational cycle, process 600 may access (at 660) the one or more actuator or sensors associated with the actuators. Process 600 may determine (at 670), based on the actuator or sensor access, whether the selected instance objective was successfully completed during the current operational cycle.

In response to determining (at 670—Yes) that the selected instance objective was successfully completed, process 600 may determine (at 680) if additional instance objectives remain. In response to determining (at 680—Yes) that additional instance objectives remain, process 600 may select (at 640) a next instance objective, and may control (at 650) actuators of the robot to execute movements or operations that are associated with the selected instance objective. In response to determining (at 680—No) that there are no remaining instance objectives, process 600 may obtain (at 610) a next waypoint from the spatiotemporal plan, process 600 may be restarted, or process 600 may end if the spatiotemporal plan is complete and there are no remaining waypoints to execute.

In response to determining (at 670—No) that the selected instance objective was not successfully completed, process 600 may further determine (at 675) if additional instance objectives remain for resolving the failed executed of the current selected instance objective. The additional instance objectives may include instance objectives set aside as part of a buffer or as additional actuator movements or operations that are to be performed within the amount of time that remains from the time envelope of the particular waypoint.

In response to determining (at 675—Yes) additional instance objectives remain to resolve the failed instance objective execution, process 600 may replan (at 685) the actuator movements or operations to perform over the remaining instance objectives. If the spatiotemporal controller created an instance objective buffer, the replanning (at 685) may include executing the incomplete movements or operations from the current instance objective using instance objectives from the buffer. Other movements or operations planned for instance objectives following the current instance objective may be delayed until execution of the incomplete movements or operations via execution of the instance objectives from the buffer is complete. If the spatiotemporal controller has no buffer or has already used the instance objectives of the buffer, the replanning (at 685) may include re-adjusting the actuator movements or operations to be executed in the remaining instance objectives to include execution of the incomplete movements or operations from the current instance objective. For instance, the spatiotemporal controller may accelerate some of the remaining movements or operations so that they can be executed in one or more fewer instance objectives, and using the freed instance objectives for execution of the incomplete movements or operations from the current instance objective. After replanning (at 685), process 600 may include selecting (at 640) a next instance objective from the replanned set of instance objectives, and controlling (at 650) actuator movements and operations according to the replanned instance objective.

In response to determining (at 675—No) that there are no remaining instance objectives to resolve the failed instance objective execution, process 600 may generate (at 690) and/or distribute a failure message to the other robots or the central planner. The failure message may indicate that the particular waypoint could not be successfully executed. In response, a new spatiotemporal plan may be created for the robot. Other robots can also attempt to work around the failure if the failure creates a conflict in shared resources the other robots are to access.

Server, device, and machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 7:
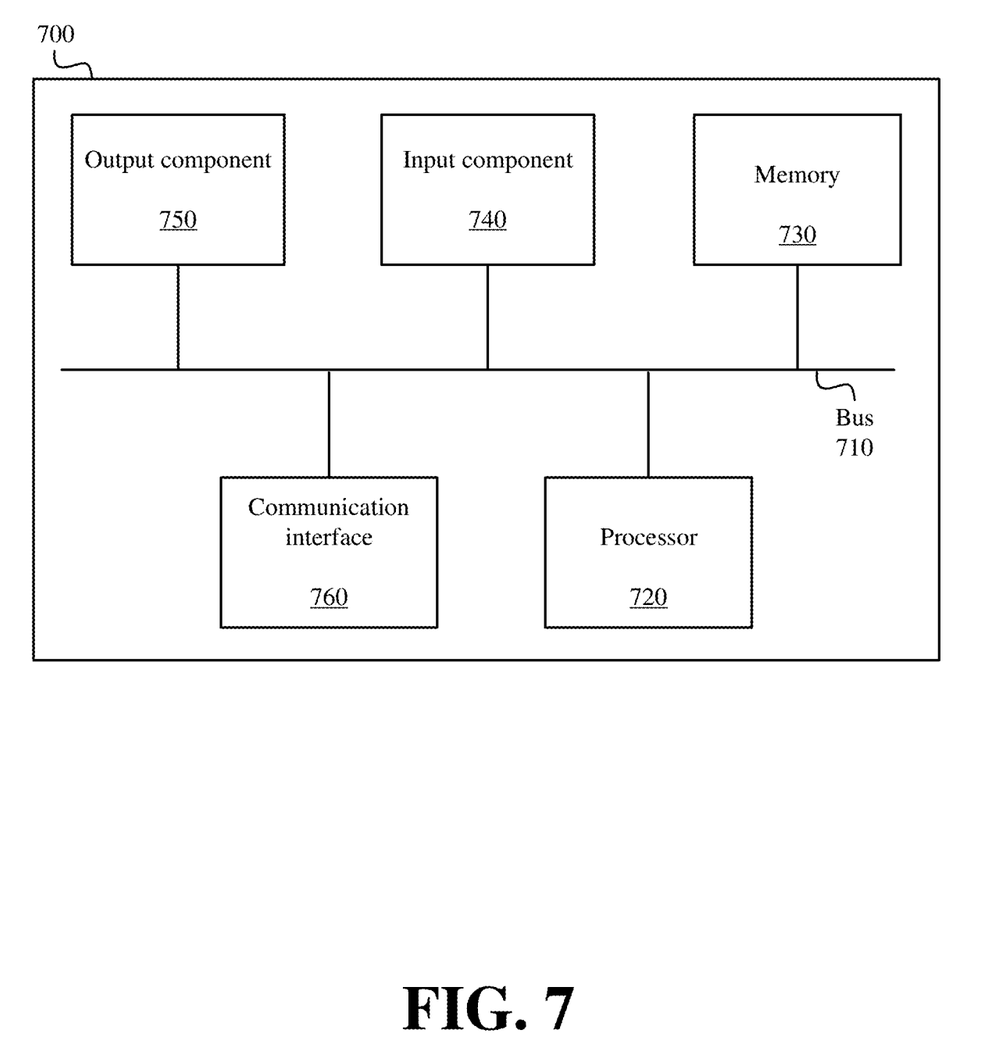
FIG. 7 illustrates example components of one or more devices, according to one or more embodiments described herein.

FIG. 7 is a diagram of example components of device 700. Device 700 may be used to implement certain of the devices described above (e.g., the central planner, the robots, the spatiotemporal controller, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, WiFi radio, LTE radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for autonomous robotic operation, the method comprising:
    receiving, at a controller of a robot, a task and a time by which to complete the task;
    determining, by operation of the controller, one or more actuators of the robot performing movements or operations associated with execution of the task;
    partitioning, by operation of the controller, the task to a plurality of subtasks based on a number of operational cycles the controller performs in the time to complete the task;
    defining, by operation of the controller, a first set of the plurality of subtasks to control the one or more actuators in performing the movements or operations associated with execution of the task, and a different second set of the plurality of subtasks as a buffer;
    detecting completion of a first set of the movements or operations in response to the controller executing at least one of the first set of subtasks; and
    adjusting, by the controller, a size of the buffer as a remaining amount of the time decreases, wherein said adjusting comprises:
        redefining the buffer by removing one or more subtasks from the second set of subtasks; and
        reassigning the one or more subtasks from the second set of subtasks as additional operational cycles of the controller with which to control the one or more actuators in performing a remaining set of the movements or operations.

2. The method of claim 1, wherein the adjusting comprises changing power supplied to the one or more actuators during execution of each remaining subtask of the first set of subtasks.

3. The method of claim 1, wherein the adjusting comprises issuing a new command from the controller to the one or more actuators during execution of each remaining subtask of the first set of subtasks, the one or more actuators producing a minute movement or operation in response to each new command.

4. The method of claim 1 further comprising moving the robot in completing the task by the time based on the controller successfully executing each subtask of the first set of subtasks.

5. The method of claim 1, wherein the one or more actuators comprise one or more of a drive motor, lift, vacuum, mechanical arm, grabber, retriever, or powered mechanical element of the robot.

6. The method of claim 1 further comprising determining at least one performance parameter for each of the one or more actuators, the performance parameter defining a time by which a corresponding actuator performs a specific movement or operation.

7. The method of claim 1 further comprising continuously updating control of the one or more actuators by the controller based on (i) a difference between actual movements or operations of the robot and expected movements or operations of the robot resulting from execution of a first subset of the first set of the subtasks, and (ii) subtasks of the second set of subtasks reserved as the buffer.

8. The method of claim 1 further comprising accessing, by the controller, one or more sensors tracking movement or operation of the one or more actuators.

9. The method of claim 8 further comprising determining an incomplete movement or operation produced by a particular actuator during execution of a particular subtask based on said accessing.

10. The method of claim 9 further comprising replanning, by the controller, movements or operations to perform using remaining unexecuted subtasks of the plurality of subtasks in response to determining the incomplete movement or operation.

11. A method comprising:
receiving, at a controller of a first robot, a plan comprising a shared resource, a time interval by which the first robot is to access the shared resource, and a precedence order that provides a second robot earlier access to the shared resource than the first robot;
providing, by operation of the controller, a first set of adjustments to one or more actuators controlling the physical operation of the first robot during a first subinterval of the time interval, the one or more actuators performing a first set of physical operations at a first rate based on the first set of adjustments;
detecting, by operation of the controller, that the second robot continues to have earlier access to the shared resource at the end of first subinterval as a result of the second robot not having accessed the shared resource by the end of the first subinterval; and
providing, by operation of the controller, a different second set of adjustments to the one or more actuators during a second subinterval of the time interval as a result of the precedence order from the plan continuing to provide the second robot earlier access to the shared resource by the end of the first subinterval, the one or more actuators performing a second set of physical operations at a different second rate based on the second set of adjustments.

12. The method of claim 11 further comprising receiving the shared resource as part of a plan comprising a plurality of shared resources, and verifying kinematic feasibility for accessing the shared resource within the time interval based on actual constraints and physical operations of the one or more actuators, wherein said verifying comprises signaling a planner with acceptance of the plan.

13. The method of claim 12 further comprising executing the plan in response to said verifying, and requesting a new plan that modifies one or more of the shared resource or time interval in response to unsuccessfully verifying the kinematic feasibility for accessing the shared resource within the time interval.

14. The method of claim 11 further comprising partitioning, by operation of the controller, a task for accessing the shared resource into a plurality of subtasks, and partitioning the time interval into a different subinterval for each subtask of the plurality of subtasks.

15. The method of claim 14 further comprising determining, by operation of the controller, that the first set of adjustments to the one or more actuators produce physical operations that complete a first subtask within the first subinterval, and determining, by operation of the controller, that a different third set of adjustments to the one or more actuators produce physical operations that complete a second subtask within the second subinterval.

16. The method of claim 15 further comprising substituting, by operation of the controller, the third set of adjustments to the one or more actuators with the second set of adjustments based on said detecting.

17. A robot actuator controller comprising:
one or more processors configured to:
receive a task and a time by which to complete the task;
determine one or more actuators of a robot associated with execution of the task;
define a sequence of movements or operations by which the one or more actuators execute the task in the time; and
continually modify control parameters of the one or more actuators at each operational cycle of the controller, wherein the controller executes a plurality of operational cycles in the time, wherein modifying the control parameters comprises adjusting the one or more actuators or commands issued to the one or more actuators at each operational cycle based on successful or unsuccessful execution of a movement or operation by the one or more actuators during at least one previous operational cycle, wherein successful execution comprises the one or more actuators completing the movement or operation from the at least one previous operational cycle prior to a next operational cycle, and wherein unsuccessful execution comprises the one or more actuators not fully completing the movement or operation from the at least one previous operational cycle prior to the next operational cycle.

18. The method of claim 1, wherein redefining the buffer comprises:
removing a first number of subtasks from the second set of subtasks in response to a first number of movements or operations remaining with a particular amount of the time remaining; and
removing a second number of subtasks from the second set of subtasks in response to a different second number of movements or operations remaining with the particular amount of the time remaining.

* * * * *